April 7, 1959 — I. SISLIK — 2,880,641
PUSH-ON FASTENER WITH TORSION SPRING TEETH
Filed Aug. 1, 1958 — 2 Sheets-Sheet 1
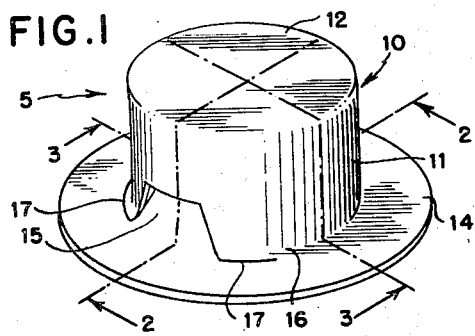
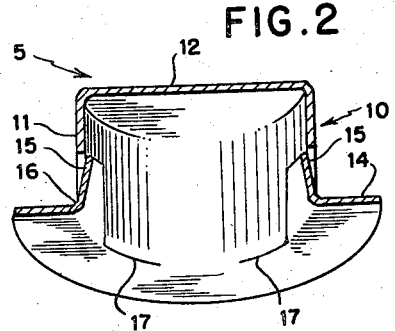
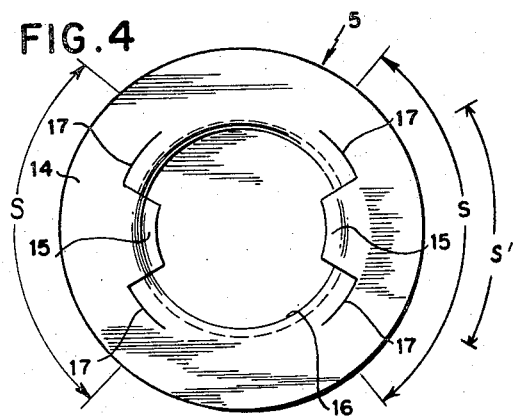
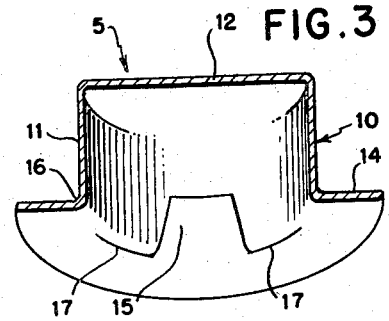
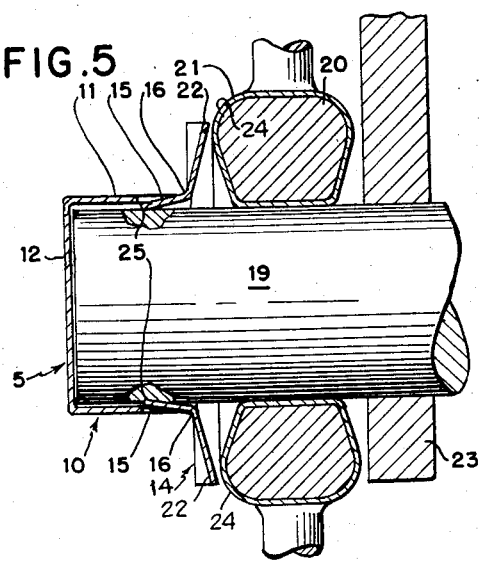
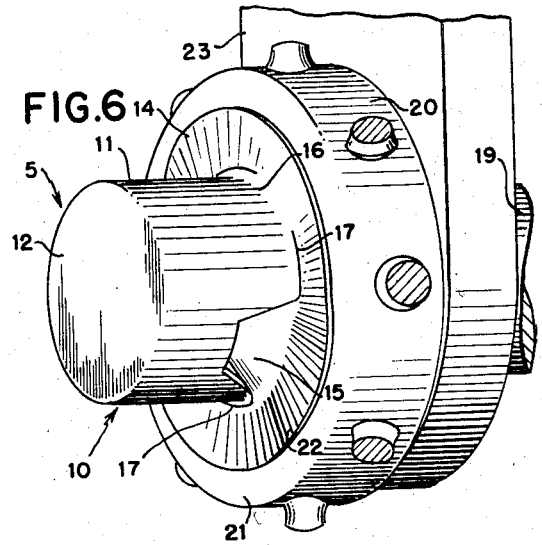
INVENTOR.
Ivan Sislik
BY Charles F. Chisholm
ATTORNEY April 7, 1959          I. SISLIK          2,880,641

PUSH-ON FASTENER WITH TORSION SPRING TEETH

Filed Aug. 1, 1958          2 Sheets-Sheet 2

INVENTOR.
Ivan Sislik

BY Charles F. Chisholm
ATTORNEY

United States Patent Office 2,880,641
Patented Apr. 7, 1959

2,880,641

PUSH-ON FASTENER WITH TORSION SPRING TEETH

Ivan Sislik, Bound Brook, N.J., assignor to The Palnut Company, Mountainside, N.J., a corporation of New Jersey Application August 1, 1958, Serial No. 752,480

4 Claims. (Cl. 85—35)

This invention relates to sheet metal fasteners of the push-on type and to assemblies made therefrom. The present invention is also disclosed in my application Serial No. 493,930 filed March 14, 1955, and the present application is a continuation-in-part of that application.

The fastener of the invention is designed to be employed as a load-sustaining member on a stud or shaft, which is usually in the form of a smooth-surfaced cylinder. The fastener is adapted to be applied to the stud or shaft by essentially purely axial movement of the fastener with respect to the stud or shaft.

Push-on fasteners are now widely used, especially in installations wherein light sheet metal or plastic parts are held on various devices, for example trim attached to automobile dash boards, radio cabinets, etc. In such cases, the fastener is called upon to resist only relatively little axial thrust, and various types of prior art fasteners have been adequate for such purposes. For such uses, push-on fasteners possess marked ecnoomy over threaded nuts, since push-on fasteners are known which may be cheaply made and easily applied, and since the stud or shaft need not be threaded.

For more rigorous applications, however, wherein the fastener during use is called upon to resist quite substantial axial thrust, particularly when the fastener is subjected to axial impacts tending to remove it from the shaft or stud, prior art sheet metal push-on fasteners have had undesirable limitations. Some prior art sheet metal push-on fasteners, including those which do withstand appreciable end thrust, are hard to apply to the stud or shaft. Typical of such prior fasteners are those employing a multiplicity of stiff, radially inwardly projecting fingers or teeth located in one or more transverse planes. This type of fastener is also prone to creep or move as a whole on the shaft or stud when subjected to substantial end thrust and thus is particularly unsatisfactory in applications wherein the parts held by the fastener have normal endwise play. When the fastener creeps, the range of play of the parts increases and thus the severity of the impacts upon the fastener also increases. Furthermore, some prior art sheet metal push-on fasteners vary widely as to performance with rather small variations in the diameter of the shaft or stud to which they are applied; thus, in a single lot of prior art push-on fasteners, there will often be a wide variation in their holding strengths when applied to shafts which merely vary in diameter within expected commercial tolerances.

Among the objects of the present invention are to provide an improved sheet metal push-on fastener which is capable of facile application to a shaft or stud, to provide an improved sheet metal push-on fastener which has high load-sustaining capacity, to provide an improved sheet metal push-on fastener which remains accurately positioned endwise of the stud despite large axial thrust and/or impacts against it, to provide an improved sheet metal push-on fastener which grips the stud more tightly upon being subjected to end thrust, to provide such a fastener in which endwise motion of the fastener as a whole relative to the stud is not required to effect the increased gripping action, and to provide an improved sheet metal push-on fastener which has a cushioning washerlike flange integral therewith.

An additional object of the invention resides in the provision of a sheet metal push-on fastener of the type indicated, which is not unduly critical with respect to the size of the shaft or stud with which it is used, and which is held against any marked canting on the shaft.

A further object of the invention lies in the provision of an improved one-piece sheet metal push-on fastener which is capable of rapid, accurate, inexpensive manufacture on a quantity production basis.

A still further object of the invention resides in the provision of an improved shaft-and-fastener assembly, or stud-and-fastener assembly, which more effectively retains a rotatable or slidable member confined on the shaft or stud by the fastener.

Further objects and advantages will be apparent from the disclosure hereof. While I am setting forth the best modes which I have thus far contemplated of carrying out my invention, the disclosure hereof is by way of illustration and example.

My invention is defined in the claims. In the claims, as well as in the description, parts may at times be identified by specific names for ease of reference and ready understanding, but such nomenclature is to be understood as having the broadest meaning consistent with the context and with the concept of my invention as distinguished from the pertinent prior art. Where parts are, for clarity and convenience, referred to on the basis of their oriented position shown in the drawing, or in any other oriented position, no limitation as to the positioning of the fastener or the assembly is to be inferred, as the fastener may be used on a male member which extends upwardly, downwardly, horizontally or in any inclined direction.

All views of the drawing are on an enlarged scale. In the drawings:

Fig. 1 is a view in perspective of a sheet metal push-on fastener embodying the present invention.

Fig. 2 is a sectional view of the fastener, in perspective, the plane of the section being indicated by the line 2—2 of Fig. 1.

Fig. 3 is also a sectional view of the fastener, in perspective, the plane of the section being displaced 90° from that of Fig. 2 and being indicated by the line 3—3 in Fig. 1.

Fig. 4 is a bottom plan view of the fastener.

Fig. 5 is a fragmentary view showing a wheel, such as a doll carriage wheel, retained on its shaft by the fastener of Figs. 1–4. The view is a section taken longitudinally of the shaft, the shaft itself being shown in elevation except for small portions shown in section to reveal the manner in which the shaft is gripped by the teeth of the fastener.

Fig. 6 is a perspective view of the assembled structure of Fig. 5, in the condition shown in Fig. 5.

Figure 9:
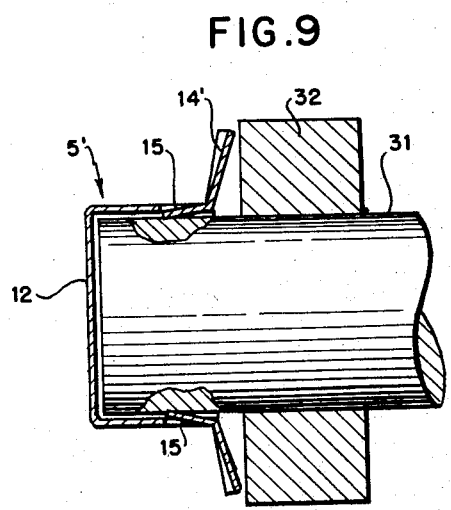

Fig. 9 is a fragmentary view showing a flat-faced member retained on a shaft by the fastener of the invention, the fastener in this instance being slightly modified for better coaction with the flat face of the retained member. The view is a section taken longitudinally of the shaft, the shaft itself being shown in elevation except for small portions shown in section to reveal the manner in which the shaft is gripped by the teeth of the fastener.

Figure 10:
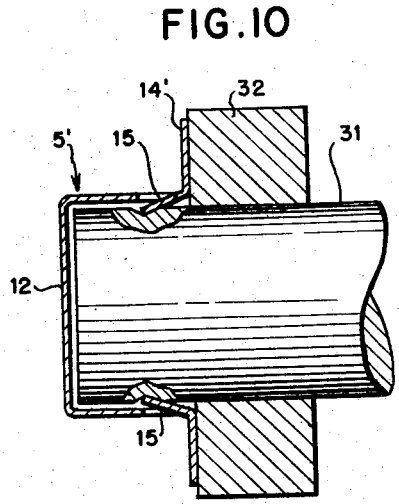

Fig. 10 is a view similar to Fig. 9 but showing the condition when the retained member is forced to the left and strongly engages the fastener.

Figure 11:
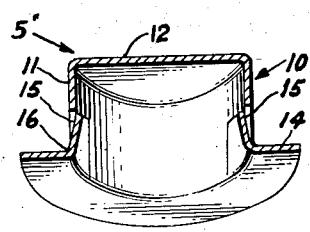

Fig. 11 is a sectional view corresponding to Fig. 2 but on a smaller scale and showing a second modification of the fastener of Figs. 1–8.

Reference will first be had to Figs. 1–4. The hat-shaped fastener, designated as a whole by 5, has a shaft or stud-receiving cuplike body 10 with a circular cylindrical sidewall 11 and a transverse end wall 12. An annular flange 14, formed in one piece with the body 10, projects radially outwardly from the end of the sidewall that is at the bottom in Figs. 1, 2, and 3. The flange is connected to the sidewall by the short-radiused annular fillet 16 at the juncture of the flange and sidewall. The flange 14 of the fastener 5 in its relaxed state lies substantially perpendicular to the longitudinal axis of the fastener, which is the same as the axis of cylinder 11.

The fastener 5 is provided with two diametrically opposed shaft-engaging or stud-engaging fingers or teeth 15, 15, which are struck inwardly from the lower portion of the sidewall 11 with the bases of the teeth extending a short distance outwardly into the flange 14. In the relaxed, unapplied, condition of the fastener shown in Figs. 1–4, the teeth 15, 15 lie with their main extents at a small angle with respect to the axis of the fastener and with their upper inner ends lying somewhat inwardly of the inner surface of the sidewall. The teeth 15, 15 are symmetrical about the plane 2—2 (Fig. 1) and taper upwardly from broad bases to somewhat narrower upper ends of appreciable width. The base of each tooth is homogeneous with flange 14 at the portions of the flange directly confronting the teeth. At each side of the base of each tooth the flange is severed by a circumferentially-extending slit 17. The slits 17 in the fastener shown are all of the same length, and each extends for a substantial distance from the base of its associated tooth 15.

The fastener 5 is formed of suitable sheet metal stock, such as spring steel which is hardened and tempered after completion of the forming operations. Thus, the fastener, including the flange 14 and the various portions thereof, are springy and are markedly resilient. The construction and formation of the fastener, aided by this resiliency, imparts to the fastener desirable and effective characteristics which will be pointed out.

Figs. 5–8 show somewhat diagrammatically and on a greatly enlarged scale a shaft and wheel assembly of a doll carriage. In these figures there is shown a portion of an axle shaft 19 of circular cross section which passes through and beyond a bracket or frame member 23 that is part of the doll carriage body. Rotatably mounted on shaft 19 is a wheel having a hub 20 which is retained by the fastener 5 applied to the end of the shaft as by being hammered or pushed thereon until it bottoms or substantially bottoms on the shaft. When the fastener has been thus applied, the wheel hub is held so that it has a slight amount of end play between the bracket 23 and the flange 14 of the fastener.

Unless the teeth 15, 15 are quite stiff they cannot exert a strong gripping action on the shaft. If they are quite stiff, then they can flex but little. In prior art fasteners stiff teeth have resulted in a fastener that was hard to apply, and have made it impossible to uniformly obtain strong gripping action without undue accuracy as regards the distance of the tips of the teeth from the axis of the fastener and also as regards the diameter of the shaft to which the fastener is applied. With applicant's construction the teeth may be made quite stiff without these attendant disadvantages.

As a result of the circumferential slits 17, 17 extending in opposite directions from each tooth 15, each tooth is attached to a wide arcuate resilient spring which extends through a zone S (Fig. 4). This spring is connected only at its ends to the remainder of flange 14.

The remainder of flange 14, i.e., the two circumferential zones between zones S, S, is homogeneous with sleeve portion 11 which extends across the washerlike flange portion 14 in bridgelike fashion and thereby supports such two circumferential zones against torsional flexure. Thus, the circumferential zones between zones S, S act as anchors or supports for the ends of the arcuate springs that extend through zones S, S. With each end of each spring at S supported against torsional flexure the spring itself can yield resiliently in a quasi-torsional manner and, due to its arcuate form, the spring has exceptional load-sustaining capacity. When the fastener is applied to a shaft, the stiff teeth 15, 15 flex but little. Cumulative with that small flexing the arcuate springs yield as required and are capable of accommodating quite a range of manufacturing variations in the diameter of the shaft and the distance between the tips of the opposed teeth 15, 15. Nevertheless, because of the stiffness of the teeth 15, 15, they effectively transmit to the shaft as gripping pressure the large force resiliently imposed on the teeth by the arcuate springs.

Upon application of the fastener 5 to the shaft portion 19 (Figs. 5 and 6) the free ends of the teeth 15, 15 are thrust outwardly, since in the relaxed state of the fastener the ends of such teeth are spaced from each other by a distance which is somewhat less than the diameter of the shaft for which the fastener is designed. The arcuate spring portions of the flange 14, to which the teeth 15, 15 are directly connected, yield in quasi-torsional manner and, due to their resiliency, urge the teeth into strong gripping engagement with the shaft. Thus, upon initial application of the fastener to the shaft the teeth 15, 15 tend to dig into it somewhat as indicated at 25, 25 in Fig. 5.

Due to interaction between a tooth 15 and its arcuate spring as the fastener is applied, localized inward dishing of the spring takes place in an area spreading out from the base of the tooth. Such localized dishing is shown to a greatly exaggerated degree at 22, 22 in Figs. 5 and 6, wherein the portions 22 are shown approaching the confronting rounded annular surface 24 of the wheel hub more closely than the remaining portions of the annular flange 14.

During use of the doll carriage the wheel hub 20 will shuck back and forth on the axle, thus intermittently subjecting the fastener to thrust in a direction tending to dislodge the fastener. Such thrusts will be particularly severe at times, for example, when the wheel strikes a stone which tends to urge the wheel outwardly on the shaft. The surface 24 of the hub of the wheel first contacts and tends to flatten the locally dished or distorted zones 22, 22 of the flange 14. When the end thrust of the wheel hub on the fastener is severe enough, the flange 14 will be brought to the substantially flat condition thereof shown in Figs. 7 and 8. The thrust imposed on portions 22, 22 of the flange by the zone 24 of the hub is transmitted in bent lever fashion to the teeth 15, 15, with the result that the teeth progressively grip the shaft more strongly as more and more end thrust is exerted on the flange 14 in a direction tending to dislodge the fastener.

Figure 7:
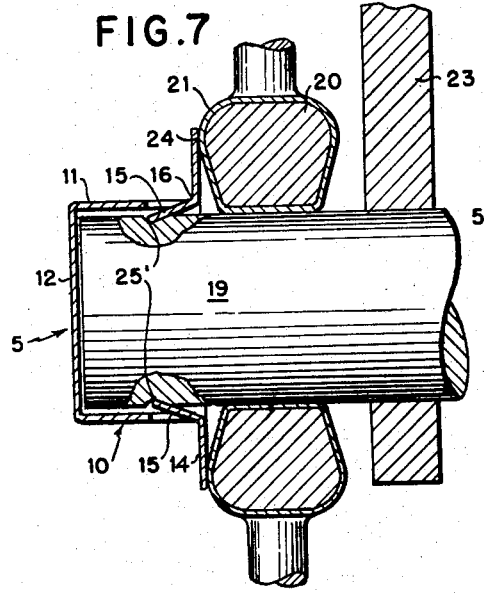
Fig. 7 is a sectional view similar to Fig. 5 but with the wheel forced to the left, whereby the hub of the wheel exerts a strong force on the fastener in a direction tending to dislodge the fastener.
Figure 8:
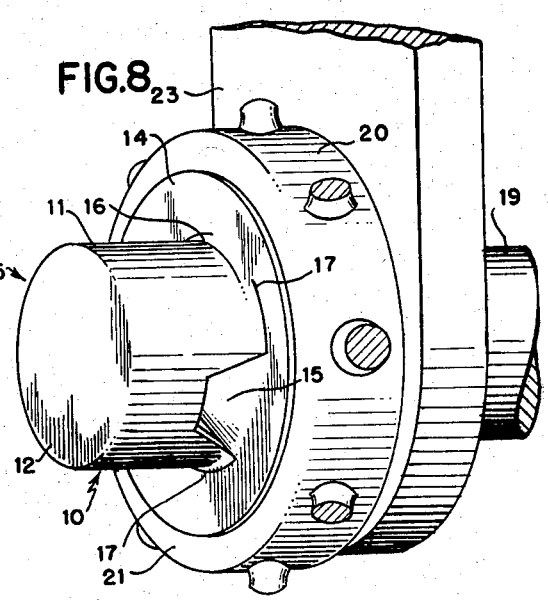
Fig. 8 is a perspective view of the assembled structure of Fig. 5, in the condition shown in Fig. 7.

This action is indicated in Fig. 7. As the flange 14 has been forced into substantially flat condition by thrust from the wheel the teeth 15, 15, have been forced into the shaft, forming hollows 25', 25' of noticeable depth. Such increased shaft-gripping action of the teeth takes place without requiring any substantial endwise movement of the fastener as a whole from its applied position. The described flattening of the flange 14 is of relatively slight extent, and the flange returns to its locally-dished condition when the endwise thrust is removed, unless the thrust was excessive. Under very severe end thrust conditions the flange 14 may be resiliently forced backwardly at least slightly past the flat condition shown in Figs. 7 and 8 thus causing the teeth 15, 15 still more strongly to engage the shaft. Substantially no distortion of the teeth 15, 15 themselves takes place during the described additional gripping actions of the fastener, since the teeth are quite stiff, are relatively short and have very substantial width. Further, the thrust imposed on the teeth 15, 15 by the shaft when it is attempted to remove the fastener from the shaft lies in a direction almost coincident with the axial extent of the teeth, so that bending stresses in the teeth are small.

The fastener 5 also functions, in effect, as a hub cap, to give fastener assemblies of the type described a finished appearance without the necessity of providing a separate cap. The flange 14 of the fastener serves as a somewhat resilient shock-absorbing thrust washer, thus not only eliminating the necessity of a separate washer, but also cushioning the wheel hub when it shucks outwardly on the shaft and contacts the fastener.

It has been found, as a result of tests conducted upon commercial ⅜" size cadmium-plated sheet metal fasteners of the type described, applied to commercial ⅜" cadmium-plated cold rolled steel shafts, that such fasteners have an axial load-sustaining capacity of from 480 to 600 pounds. Commercial ⅜" cadmium-plated cold rolled steel rod, used for such applications as doll carriage axles and the like, varies in actual size from .373" to .375" in diameter, a tolerance of .002". However, it has been found that applicant's ⅜" size fastener functions satisfactorily with shafts that vary from .370" to .377", a tolerance of over 3 times that of commercial cold rolled ⅜" rod.

The upper ends of teeth 15, 15 may extend chordally of the shaft, but I prefer that they should have a curvature equal to or somewhat less than the curvature of the shaft. The internal diameter of cylindrical portion 11 of the fastener is only a little greater than the diameter of the shaft and this, taken with the axial length of portion 11, enables portion 11 to prevent any substantial canting of the fastener on the shaft.

A satisfactory sheet metal push-on fastener in accordance with Figs. 1 to 4 has been made for ⅜" shafts from spring steel stock having a thickness of .020", the fastener having an over-all axial length of .234", and the teeth 15, 15 having an axial height of .068" above the bottom surface of flange 14. The sidewall 11 of the fastener had an inner diameter of .378", and in the relaxed unapplied fastener the inner shaft-engaging edges of the teeth were spaced apart a distance of .354". The slits 17 were .2335" from the axis of the fastener and the arcuate spring at S for each tooth extended through an angle of 96°, the base of the tooth itself occupying about 37° of that angle and being located centrally of the arcuate spring.

Figs. 9 and 10 show the fastener applied to a shaft 31 to confine a flat faced member 32, which may either rotate or reciprocate on the shaft. Despite the absence of an annular bead, such as bead 24 in Figs. 5 and 7, the same action of the fastener may be obtained when the confined member strikes the fastener in a manner tending to dislodge it. In Figs. 9 and 10 the annular flange 14' of the fastener 5' is slightly coned. When the member 32 strikes the fastener, the force of the blow is transmitted in bent lever fashion to the teeth 15, 15, causing them to more tightly grip the shaft as indicated in Fig. 10. Except for the slightly coned annular flange 14', the fastener 5' is the same as the fastener 5.

If it be desired to telescope the fastener to an intermediate position on the shaft, the top 12 may be omitted, either in Fig. 1 or Fig. 9. However, this results in a somewhat less rugged fastener, which is more difficult to apply to a shaft.

Similar results may be obtained when slits 17 are omitted, the roots of the teeth 15 being at the level of the washerlike base of the fastener. The fastener with slits 17 omitted is shown in Fig. 11, where the reference character 5" designates the fastener as a whole. Except for reference character 5" in lieu of reference character 5 and the omission of slits 17, Fig. 11 is the same as Fig. 2 though on a smaller scale. The same reference characters are used in Figs. 11 and 2 to designate the same parts.

When the circumferential slits 17 are used, the washerlike base has the circumferential spring zones S that are indicated in Fig. 4. With the slits 17 omitted each circumferential spring zone is reduced to approximately S' (Fig. 4) which, however, is still a circumferential zone of considerable length. However, since the ends of zone S' are closer to the base of the teeth, the downward flexure of the periphery of the washerlike base extends somewhat beyond the ends of the zone S'. While the elimination of slits 17 somewhat reduces the degree of downward flexure of the torsional spring zones in the washerlike base, the fastener functions in the same manner as when slits 17 are used.

I claim:

1. A hat-shaped push-on fastener for telescopic application to a male member, said fastener comprising a single piece of springy sheet metal having: an annular flange forming a washerlike base; an inverted cup, the bottom of the cup constituting the top of the hat formation and the mouth of the cup merging with the washerlike base at the inner circumference thereof, the wall of the cup being a cylindrical sleeve perpendicular to the washerlike base and adapted to closely surround the male member to which the fastener is telescopically applied; and a plurality of upwardly-extending teeth equally distributed about the sleeve; the teeth being struck inwardly somewhat from the metal of the sleeve and being severed therefrom across their tips and along their longitudinal edges extending from their tips to the washerlike base, the roots of the teeth being at the level of the washerlike base and the tips of the teeth being remote from the top of the hat formation, the teeth being inclined inwardly at a small angle to the axis of the sleeve, and the teeth being stiff and relatively inflexible; and portions of the washerlike base that are adjacent to the roots of the teeth and extend outwardly therefrom constituting spring portions whereby, when the tips of the teeth are forced outwardly by contact with the male member to which the fastener is telescopically applied, such spring portions of the washerlike base are flexed downwardly and through resilient reaction urge the tips of the teeth firmly against the male member, and such flexed spring portions being the lowermost portions of the washerlike base whereby they are initially engaged when a part on the male member moves against the fastener.

2. A fastener as in claim 1 in which slits extend circumferentially in opposite directions from the root of each tooth.

3. A male member having a smooth substantially cylindrical surface, a part on the male member and through which the male member passes, and a hat-shaped fastener confining the part on the male member, the fastener being telescoped onto the male member with the top of the hat formation against the end of the male member, the fastener comprising a single piece of springy sheet metal having: an annular washerlike base surrounding the male member and extending outwardly therefrom; a cylindrical sleeve perpendicular to the washerlike base, the sleeve closely surrounding the male member and connecting the inner periphery of the washerlike base with the top of the hat formation; and a single pair of diametrically-disposed teeth extending from the washerlike base toward the top of the hat formation, the teeth being struck inwardly somewhat from the metal of the sleeve and being severed therefrom across their tips and along their longitudinal edges extending from their tips to the washerlike base, the roots of the teeth being at the level of the washerlike base and the tips of the teeth being remote from the top of the hat formation, the teeth being inclined at a small angle toward the axis of the male member, and the teeth being stiff and relatively inflexible; and portions of the washerlike base that are adjacent to the roots of the teeth and extend outwardly therefrom constituting spring portions, such spring portions being flexed downwardly and through resilient reaction urging the tips of the teeth into firm holding engagement with the male member, and such flexed spring portions being the lowermost portions of the washerlike base whereby they are initially engaged when the part on the male member moves against the fastener.

4. An assembly as in claim 3 in which slits extend circumferentially in opposite directions from the root of each tooth.

No references cited.